United States Patent [19]

Haskins

[11] Patent Number: 4,718,085
[45] Date of Patent: Jan. 5, 1988

[54] TELEPHONE CORD GROOVE AND CORD RETAINING MEANS

[75] Inventor: Steve W. Haskins, Mt. Juliet, Tenn.

[73] Assignee: Northern Telecom Limited, Montreal, Canada

[21] Appl. No.: 925,222

[22] Filed: Oct. 31, 1986

[51] Int. Cl.$^4$ .......................... H04M 1/15; F16L 3/10; H01R 13/58
[52] U.S. Cl. .................................. 379/438; 174/175; 248/74.1; 379/447; 439/452
[58] Field of Search ............... 379/438, 437, 440, 447, 379/450; 174/175; 248/51, 74.1; 339/103 R, 103 B, 103 C, 103 M; 439/452, 457

[56] References Cited

U.S. PATENT DOCUMENTS

| 2,292,140 | 8/1942 | Lofgren | 248/51 |
| 2,802,249 | 8/1957 | Kulp | 248/51 |
| 4,029,277 | 6/1977 | Bulanda | 248/74.1 |
| 4,284,855 | 8/1981 | Adams et al. | 379/440 |
| 4,292,477 | 9/1981 | Adams et al. | 379/435 |

FOREIGN PATENT DOCUMENTS 216712 11/1956 Australia ............................ 174/175
688260 3/1953 United Kingdom ................. 248/51

Primary Examiner—Jin F. Ng
Assistant Examiner—Danita R. Byrd
Attorney, Agent, or Firm—Schwartz, Jeffery, Schwaab, Mack, Blumenthal & Evans

[57] ABSTRACT

A cord receiving and retaining groove in the back surface or web of a telephone set base has one or more cord retaining formations spaced along the groove. Two spaced parallel walls extend inward from the groove, away from the back surface. A cantilever member is formed in each wall, the cantilever member integral with the wall at its fixed end and extending to a free end in the groove. The cantilever members are in opposition. A projection is formed on the free end of each cantilever member, the projections extending towards each other. A cord is pushed into the groove and snaps past the projections on the free ends of the cantilever members. The cantilever members are given sufficient lever length for ready deflection by the walls extending from the groove. The walls permit flexing of the cantilever members over a longer length than if the cantilever members were formed only in the walls of the groove.

7 Claims, 6 Drawing Figures

TELEPHONE CORD GROOVE AND CORD RETAINING MEANS

BACKGROUND OF THE INVENTION

1. Field of the Invention

This invention relates to a telephone cord groove, typically in a telephone set base, and cord retaining means in the groove.

Particularly, the invention provides a cord groove and retaining means in which the cord is very easily and quickly positioned.

2. Related Art

It is often a feature of the design of a telephone set that it be capable of being mounted on a desk or table top, or similar surface, or on a wall surface. In such arrangements, a different line cord is used for each orientation. Thus, a long line cord is used for desk mounting, going from the telephone to an outlet on a wall or other position. In wall mounting, a short line cord is used. Conveniently, the alternative line cords plug into a jack in the telephone set base. It can also be that the handset cord is plugged into a jack in the base, adjacent to the jack for the line cord. The jacks are mounted within the base and can be accessed via a recess in the back surface of the base.

When a long line cord is so plugged in, it is necessary for it to be recessed into the base, both for proper seating of the base on a support surface and to provide a degree of protection against pulling on the plug and jack. Similarly, a handset cord, if so connected, also requires recessing into the base.

In previous arrangements, grooves having local bends are used. Such grooves are very difficult to use, the cord being extremely difficult to push into the groove. It is a slow operation and therefore relatively labour intensive.

SUMMARY OF THE INVENTION

The present invention provides a groove having spaced deflectable snap members spaced therealong. The cord can be inserted by resting the cord on the groove and then pulling down on the cord at each end of the groove, or by pressure on the cord. Because the back surface of the base is quite thin, it is not possible to provide snap members with sufficient deflection within this thickness. This is overcome by forming extensions from the base back surface, into the base and forming the deflectable members from the extensions.

Broadly, the invention provides a telephone set base having at least one cord receiving and retaining groove in a back surface, the groove comprising a U-shaped section open at the back surface of the base, and a plurality of extensions extending from said groove away from said back surface, each of said extensions having spaced opposed walls substantially aligned with the walls of the U-shaped section, deflectable cantilever members being formed in the walls of the extensions and extending in gaps in the walls of the U-shaped sections, the free ends of the cantilever members each having a projection extending toward each other, a cord snapping past the projections into the groove.

BRIEF DESCRIPTION OF THE DRAWINGS

The invention will be readily understood by the following description of certain embodiments, by way of example, in conjunction with the accompanying drawings, in which:

FIG. 5 is a cross-section on the line V—V of FIG. 4; and

FIG. 6 is a perspective view, on the inside of the base, of the deflectable snap members shown in FIGS. 4 and 5.

DETAILED DESCRIPTION OF THE DRAWINGS

Figure 1:
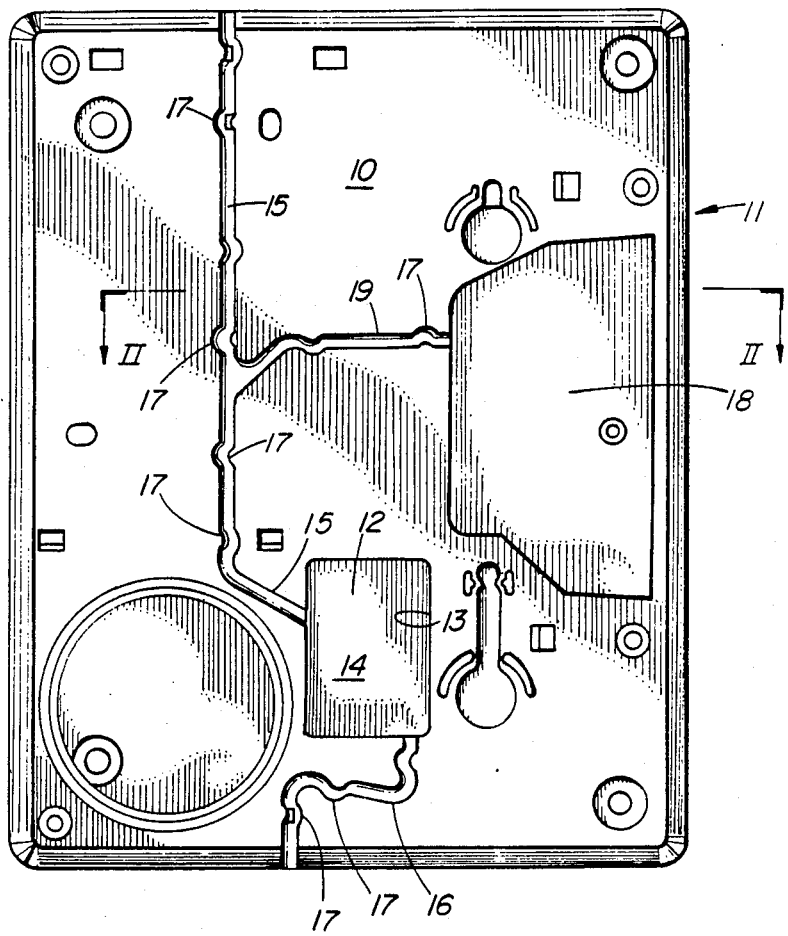
FIG. 1 is a view on the outside bottom surface of a previous groove arrangement.

In FIG. 1, the back surface 10 of a prior art telephone set base 11 is seen. A recess 12 extends up and inward into the base, the recess being enclosed on three sides and open at the fourth side 13. The recess also has a top 14. When the base and associated components are assembled, two modular jacks are positioned at the open side 13 for access from the recess. Connections are made by inserting plugs into the jacks, in the recess.

Figure 2:
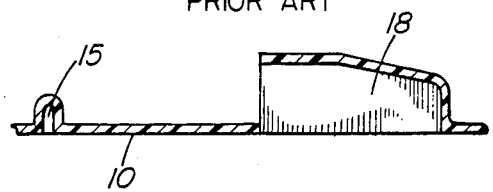
FIG. 2 is a cross-section on the line 11—11 of FIG. 1.

For desk or similar mounting, a long line cord is positioned in the groove 15 and a handset cord is positioned in groove 16. The grooves have spaced local bends 17. The grooves extend up into the base from the back surface, as illustrated in FIG. 2. For wall or similar mounting, a short line cord extends from a further recess 18 via a groove 19 and apart of the groove 15. The bends 17 are quite effective in retaining the cords in the grooves, but inserting the cords is not easy and is labour intensive. In use, the telephone set owner may wish to change from desk mounting to wall mounting, or the reverse, and needs to change the line cord. This can be an annoying procedure, particularly for people with reduced dexterity of the hands.

Figure 3:
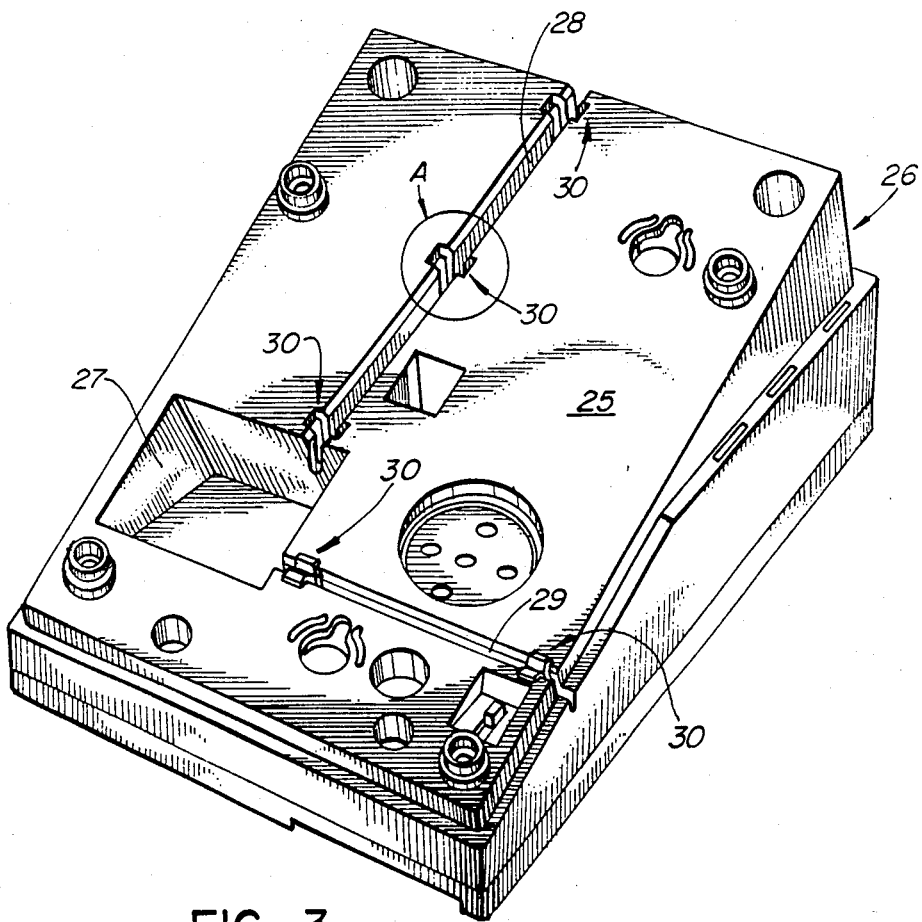
FIG. 3 is a perspective view on the back surface of the base of a telephone set.

In FIG. 3 is seen the bottom surface 25 of a telephone set base 26. In this example, a recess 27 provides access to modular jacks mounted in the base. A line cord is positioned in a groove 28, leading from a rear end of the base to the recess 27. A handset cord is positioned in a groove 29 extending from a front edge of the base to recess 27. The particular positioning of the grooves 28 and 29 can be moved for different telephone sets, and a further groove can be provided for an optional line cord for wall mounting if desired. A cord is retained in a groove by a cord retaining formation comprising a pair of deflectable snap members, indicated generally at 30 in FIG. 3.

Figure 4:
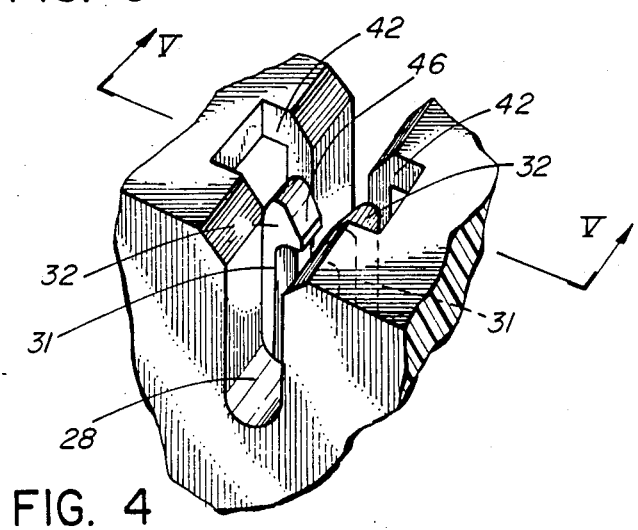
FIG. 4 is an enlarged view of the area in the circle A in FIG. 3.

The arrangement of a pair of deflectable snap members as in FIG. 3 is illustrated to a larger scale in FIG. 4. As seen, a pair of deflectable sna members 31 have projections 32 at their ends, the projections extending toward each other, the gap between the projections being less than the distance between the main parts of the members 31, and also less than the thickness of the telephone cord to be fitted in the groove.

The structure of a cord retaining formation is seen more clearly in FIGS. 5 and 6. Extending inward from the inner surface of the bottom web or panel 33 of the base 26 is U-shaped member 37 forming groove 28. Extending from the U-shaped member 37 are two parallel walls 38. In the example, the walls 38 are connected at each end by an end wall 39. A cantilever member is formed in and extends from each wall 38, extending in apertures 41 formed in the walls of the U-shaped member 37. The cantilever members form the deflectable snap members 31. The projections 32 are formed at the free ends of the cantilever members and are below the bottom surface 25 as viewed in FIG. 4. The edges 45 of the grooves 28 and 29 are chamfered to provide a guide into the grooves and into the snap members, which have downwardly and inwardly inclined surfaces 46. The walls 38 extending from the U-shaped member 37 provide a suitable length dimension for the members 31.

A telephone cord is very easily positioned in a groove. The cord is merely positioned over a groove and then rubbing a fingertip along the cord will push the cord into the groove, snapping past the snap members 31. A pull on a cord will remove the cord from the groove quite readily. Recesses 42 can be provided, aligned with each cantilever member 31.

Also illustrated in FIGS. 5 and 6 is a modification in which a low wall 43 is formed behind each recess 42. These walls prevent the free ends of the snap members 31 from being forced too far beneath the web 33, with the possibility of breakage. Also, it makes it more difficult for items to be pushed through the recesses into the interior of the telephone set base.

What is claimed is:

1. A telephone set base comprising a back surface, and at least one cord receiving and retaining groove in said back surface, said groove having a U-shaped section open at said back surface and at least one cord retaining formation situated intermediate a pair of ends of said groove, said cord retaining formation comprising two parallel walls extending from said groove in a direction away from said back surface, a cantilever member formed in each wall, said cantilever members in opposition, each said cantilever member having a fixed end integral with said wall at a position remote from said back surface, and a free end positioned in said groove adjacent to said back surface, each said cantilever member having a projection at its free end, said projections extending towards each other, such that a cord being pushed into said groove deflects said cantilever members as the cord is pushed past said projections, and said projections snap back over the cord when the cord is fully in said groove.

2. A telephone set base as claimed in claim 1, including a plurality of cord retaining formations spaced along said groove.

3. A telephone set base as claimed in claim 1, including an aperture in each side of said groove at said at least one retaining formation, the cantilever members being positioned in said apertures.

4. A telephone set base as claimed in claim 1, said back surface comprising a web having inner and outer surfaces, said free ends of said cantilever members extending close to but clear of said inner surface, and a wall on said inner surface on each side of each retaining formation, a wall aligned with each cantilever member, the walls positioned to restrict deflection of the cantilever members.

5. A telephone set base as claimed in claim 1, each of said projections having a sloping end surface inclined downwardly and inwardly from said back surface towards the center of the groove.

6. A telephone set base as claimed in claim 1, the groove having chamfered edges to guide said cord into the groove.

7. A telephone set base as claimed in claim 1, said two parallel walls connected at their ends remote from said back surface by end walls extending between the two parallel walls.

* * * * *